(12) United States Patent
Baudry et al.

(10) Patent No.: US 8,270,485 B2
(45) Date of Patent: Sep. 18, 2012

(54) DIGITAL WATERMARKING METHOD

(75) Inventors: Séverine Baudry, Rennes (FR);
Philippe Nguyen, Rennes (FR); Noémie Lechable, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 917 days.

(21) Appl. No.: 12/226,585

(22) PCT Filed: Apr. 23, 2007

(86) PCT No.: PCT/EP2007/053950
§ 371 (c)(1),
(2), (4) Date: Oct. 22, 2008

(87) PCT Pub. No.: WO2007/122216
PCT Pub. Date: Nov. 1, 2007

(65) Prior Publication Data
US 2009/0175335 A1 Jul. 9, 2009

(30) Foreign Application Priority Data
Apr. 25, 2006 (FR) ...................... 06 51458

(51) Int. Cl.
*H04N 7/12* (2006.01)
*H04N 9/80* (2006.01)
(52) U.S. Cl. .................. 375/240.12; 386/260; 358/3.28; 713/176
(58) Field of Classification Search .............. 375/240.12
See application file for complete search history.

(56) References Cited

U.S. PATENT DOCUMENTS

| 6,850,624 B1 | 2/2005 | Shinoda et al. |
| 7,103,104 B1 | 9/2006 | Bruls et al. |

FOREIGN PATENT DOCUMENTS

| EP | 1091317 A2 * | 4/2001 |
| JP | 2001-157030 | 6/2001 |
| JP | 2003-505956 | 2/2003 |
| JP | 2006081065 | 3/2006 |

OTHER PUBLICATIONS

"Data Hiding and Watermarking in JPEG Compressed Domain by DC Coefficient Modification" by Wong et al., Security andWatermarking of Multimedia Contents II, Proceedings of SPIE vol. 3971, p. 237-244; Jan. 2000.*
"Optimal Differential Energy Watermarking of DCT Encoded Images and Video"; Gerrit C. Langelaar and Reginald L. Lagendijk; IEEE Transactions on Image Processing; vol. 10, No. 1; Jan. 2001.*
"An Adaptive Compressed MPEG-2 Video Watermarking Scheme"; Satyen Biswas, Sunil R. Das, Emil M. Petriu; IEEE Transactions on Instrumentation and Measurement; vol. 54, No. 5; Oct. 2005.*
Hongmei Liu et al: "A MPEG-2 video watermarking algorithm with compensation in bit stream" Digital Rights Management. Technologies, Issues Challenges and Systems. First Int'l Conf. Oct. 31, 2005, pp. 123-134, XP002445774.
F. Hartung et al: "Digital watermarking of MPEG-2 coded video in the bitstream domain" Acoustics, Speech, and Signal Processing 1997. 1997 IEEE Int'l Conf. on Munich, Germany, Apr. 21-24, 1997, IEEE, vol. 4, Apr. 21, 1997, pp. 2621-2624, XP010225693.
Jun Zhang et al: "Embedding watermark in mpeg video sequence" Multimedia Signal Processing, 2001 IEEE Fourth Workshop on Oct. 3-5, 2001, Oct. 3, 2001, pp. 535-540, XP010565828.
Raymond B. Wolfgang et al: "Perceptual Watermarks for Digital Images and Video" Proceedings of the IEEE, IEEE, NY, US, vol. 87, No. 7, Jul. 1999, XP011044240.
Search Report Dated Aug. 15, 2007.

* cited by examiner

*Primary Examiner* — Taghi Arani
*Assistant Examiner* — Mohammad Rahman
(74) *Attorney, Agent, or Firm* — Tutunjian & Bitetto, P.C.

(57) ABSTRACT

The invention relates to a method of watermarking a binary stream resulting from the encoding of a set of coefficients comprising at least one coefficient encoded by predictive coding, called predictively coded coefficient. The method comprises the steps of:
  a) identifying, in the binary stream, a first binary word representing the predictively coded coefficient;
  b) computing a modified coefficient from the predictively coded coefficient on the basis of at least one watermarking bit;
  c) encoding the modified coefficient into a second binary word; and
  d) replacing in the binary stream the first binary word with the second binary word.

7 Claims, No Drawings

DIGITAL WATERMARKING METHOD

This application claims the benefit, under 35 U.S.C. §365 of International Application PCT/EP2007/053950, filed Apr. 23, 2007, which was published in accordance with PCT Article 21(2) on Nov. 1, 2007 in English and which claims the benefit of French patent application No. 0651458, filed Apr. 25, 2006.

1. FIELD OF THE INVENTION

The invention relates to a video watermarking method. The field of the invention is the watermarking of compressed video streams.

2. BACKGROUND OF THE INVENTION

Videos are in practice very often manipulated, stored and exchanged in a compressed format (MPEG 1, MPEG2, MPEG4-H264, divX, VC1, DV25 etc.), which makes it possible to reduce the transmission bit rate, the size of the storage space or the processing time. There is often a desire to watermark these videos: for example, for a VoD (Video On Demand) application, there is a desire to watermark each of the streams sent with a unique identifier (fingerprint) for each recipient (so that, in the event of piracy, the guilty recipient can be found). The videos are, in this application, stored and sent in compressed format (e.g MPEG2 or H264). The watermark is inserted just before the file is downloaded by a user who has requested it. It would then be ineffective watermark the video in its pixel form: it would need to be decompressed, watermarked and recompressed. Apart from an excessive overhead in computation time, the act of decompressing/recompressing the video adversely affects its visual quality and weakens the watermark that has been inserted.

In addition to the universal requirements for invisibility, ruggedness and the capacity to be embedded, a stream watermarking system also mostly needs to be quick to write, and not to increase the size of the video stream, and even produce a stream of a size that is strictly identical to the original stream. This last requirement is difficult to satisfy, because any change to the image data itself can result in very major changes to the video stream and therefore, possibly, modify the size thereof. In general, the act of watermarking a stream increases its size, which causes problems when the bit rate in the networks is limited.

3. SUMMARY OF THE INVENTION

The aim of the present invention is to overcome at least one of these drawbacks by proposing a stream marking system that is quick and that generates a stream whose size is close to the size of the original stream.

To this end, the invention relates to a method of watermarking a binary stream resulting from the encoding of a set of coefficients comprising at least one coefficient encoded by predictive coding, called predictively coded coefficient. The method comprises the steps of:
a) identifying, in the binary stream, a first binary word representing the predictively coded coefficient;
b) computing a modified coefficient from the predictively coded coefficient on the basis of at least one watermarking bit; and
c) encoding the modified coefficient into a second binary word; and
d) replacing in the binary stream the first binary word with the second binary word.

Advantageously by modifying predictively coded coefficients, the watermarking method is made more robust while the size of the watermarked stream is kept close to the size of the original stream.

According to a particular aspect, the coefficients being discrete cosine transformed coefficients, the predictively coded coefficient is of null frequency.

According to one aspect of the invention, the modified coefficient is computed as the sum of the predictively coded coefficient and a marking value derived from the at least one watermarking bit.

According to another aspect of the invention, the set of coefficients comprises at least two predictively coded coefficients, a first coefficient and a second coefficient.

According to one aspect of the invention, the method further comprises before the identifying step a), a step for selecting one coefficient among the at least two coefficients and wherein steps a) to d) are applied on the selected coefficient.

According to one characteristic of the invention, the selected coefficient is selected according to a watermarking key.

Accor

According to another characteristic of the invention, the selected coefficient is selected according to a predetermined visibility criteria.

According to another aspect of the invention, the steps a) to d) are applied on the first coefficient and wherein the method further comprises the following steps applied on the second coefficient:
identifying, in the binary stream, a third binary word representing the second coefficient;
computing a second modified coefficient by substracting the marking value from the second coefficient; and
encoding the second modified coefficient into a fourth binary word; and
replacing in the binary stream the third binary word with the third binary word.

The invention also relates to a storage unit for storing a binary stream resulting from the encoding of a set of coefficients comprising at least one predictively coded coefficient, characterized in that the storage unit further comprises a marking map, the map indicating for each predictively coded coefficient an offset value with respect to the beginning of the binary stream indicating the position of a binary word, called original binary word, representing the predictively coded coefficient and associated with this offset value a modified binary word to be inserted in replacement of the original binary word.

According to one aspect, the modified binary word is generated by encoding a modified coefficient, itself computed from the predictively coded coefficient on the basis of a watermarking bit.

4. BRIEF DESCRIPTION OF THE DRAWINGS

The invention will be better understood and illustrated by means of wholly non-limiting advantageous exemplary embodiments and modes of implementation, with reference to the appended figures in which:

5. DETAILED DESCRIPTION OF PREFERRED EMBODIMENTS

The description here is based on the particular case of the MPEG 2 format. According to this preferred embodiment, certain parameters and coefficients of the stream are replaced with other values, in order to insert the watermark. In order to ensure the robustness of the watermark, the DC coefficients can advantageously be modified.

The invention described with DC coefficients that are encoded with differential coding according to MPEG2, may be applied on others type of coefficients that are encoded with predictive coding.

In MPEG2, there are three types of encoded images: I (Intra) images, P (Predicted) images and B (Bidirectional) images. The Intra images are coded independently, whereas the P and B images are encoded by temporal prediction based on one or two reference images. The reference image (unique) for a P image must be the preceding Intra image. For a B image, the reference images is (are) the preceding or next Intra or predicted image. The images of different types are combined in a GOP (Group Of Pictures), each GOP containing at least one Intra image.

Each image is divided into macroblocks of 16×16 size. Each macroblock is then subdivided into four blocks of 8×8 size. Each macroblock can be of I, P or B type. An I image will contain only I blocks, whereas a P or B image can contain I-type blocks. The macroblocks are then combined in slices, a slice comprising a certain number of consecutive macroblocks, all located in the same vertical position, i.e. on a same line of macroblocks.

Each block of an Intra macroblock is DCT transformed (DCT stands for Discrete Cosine Transform) before encoding: a DC component (frequency 0,0) and 63 AC coefficients are therefore obtained for each of the blocks. The DC coefficient of a current block, called current DC coefficient, is then encoded by prediction. The value of the difference between this current DC coefficient and the DC coefficient of the preceding block, called preceding DC coefficient, is transmitted. The syntax of a block is exhibited below in an array in the form of a pseudo-code with the same conventions as in the document ISO/IEC 13818-2. In particular, the operator '==' signifies "equal to". The operator '!' is the "NOT" logical operator.

whether it is the luminance or one of the chrominance components that is being processed. At the decoder side, the DC value of the current block is obtained by adding the value of the predictor, i.e. of the preceding DC coefficient, to that of the differential dct_dc_differential. The predictor (for the next block) then takes the value of the current DC coefficient.

The predictors are reset:
At the start of a slice,
When a non-Intra block is encountered,
When a non-encoded macroblock (or "skipped macroblock") is encountered.

The reset value of the predictor depends on the parameter intra_dc_precision transmitted in the structure picture_coding_extension.

The watermark is inserted by modifying the value of the DC coefficients of the Intra blocks. This modification can be done directly in the stream by modifying the parameter dct_dc_differential. If necessary, if the new value taken by dct_dc_differential after watermarking cannot be encoded on dct_dc_size bits, it will also be necessary to modify the latter value. In this case, the size of the stream obtained can vary after watermarking, because dct_dc_size is encoded by a variable length code. If there is a wish to strictly maintain the size of the stream, the coefficients dct_dc_differential, the modification of which also entails modifying dct_dc_size, can be excluded from the watermarking. According to a variant, changes to dct_dc_size are authorized only if the word of the variable length code obtained is of the same size. It may also happen that a slight increase of the size of the VLC word is compensated by a decrease of the number of stuffing bits. In this latter case, the size of the stream is therefore not modified. One advantage of the method is its simplicity of implementation. Indeed watermarking the stream merely entails modifying a very small number of parameters. These modifications are advantageously propagated (therefore making the watermarking more robust) over each modified slice due to the differential coding of DC coefficient. The watermarking

| block( i ) { | No. of bits | Mnemonic |
|---|---|---|
|   if ( pattern_code[i] ) { | | |
|     if ( macroblock_intra ) { | | |
|       if ( i < 4 ) { | | |
|         dct_dc_size_luminance | 2-9 | vlclbf |
|         if(dct_dc_size_luminance != 0) | | |
|           dct_dc_differential | 1-11 | Uimsbf |
|       } else { | | |
|         dct_dc_size_chrominance | 2-10 | Vlclbf |
|         if(dct_dc_size_chrominance != 0) | | |
|           dct_dc_differential | 1-11 | Uimsbf |
|       } | | |
|     } else { | | |
|       First DCT coefficient | 2-24 | vlclbf |
|     } | | |
|     while ( nextbits( ) != End of block ) | | |
|       Subsequent DCT coefficients | 3-24 | vlclbf |
|     End of block | 2 or 4 | vlclbf |
|   } | | |
| } | | | dct_dc_differential encodes the value of the difference between the current DC coefficient and the preceding DC coefficient. Its size is dct_dc_size bits which takes its value between 0 and 11 (if it is equal to 0, dct_dc_differential is not transmitted and the difference from the preceding block is zero). Dct_dc_size bits is itself encoded by a variable length code (VLC) of a size between 2 and 9 bits for the luminance. The variable length encoding tables differ according to operation can therefore be extremely fast. The method retains the size of the original stream, strictly if the size of dct_dc_size is controlled, or approximately otherwise.

The method also makes it possible, by modifying a very small portion of the stream, to insert the watermark over an important portion of the corresponding image. This is due to the differential coding of DC coefficients. The same effect may be obtain with coefficients coded with predictive coding.

In practice, it has been seen that the encoding of the DC coefficients is differential: a modification to the value of dct_dc_differential on a block leads to an effective modification of the DC on all the subsequent blocks in the slice (that is, to the right of the current block). The robustness of the watermark is thus increased.

The watermark can be inserted on Intra images and/or on the Intra blocks of the P and B images. In the latter case, the watermark is propagated only over the Intra blocks that follow the modified block in the slice.

There now follows a more precise description of the watermark modulation algorithms.

According to a first embodiment, an additive modulation algorithm is used to insert a watermark. Let bi be a watermark bit to be inserted (bi=1 or −1). A set of N slices S(k) is selected using a watermarking key and/or visibility criteria. For each S(k), the first block B(k,j) considered as a modifiable block according to the size criterion of the DC encoding explained above, where (k,j) are the coordinates of the block, is identified. The parameter dct_dc_differential(k,j) of the block B(k,j) is then modified:

$$dct\_dc\_differential'(k,j) = dct\_dc\_differential(k,j) + \alpha \cdot bi$$

dct_dc_differential'(k,j) is the modified value and $\alpha$ is an amplitude factor (an integer, e.g. $\alpha=1$) that can be used to control the visibility and the robustness of the watermark. It can vary from one slice to the next. If the size of dct_dc_differential'(k,j) differs from the size of dct_dc_differential(k,j), the value of dc_size is also modified accordingly.

According to a second embodiment, a substitutive modulation algorithm is used to insert the watermark. This algorithm, derived from the Zhao and Koch algorithm, works in the following way. A pair of slices S(k1), S(k2) is considered. S(k1) and/or S(k2) will then be modified so as to obtain an order relation:

$$Avg(S'(k1)) = Avg(S'(k2)) + \alpha bi \quad (eq.1)$$

Avg(S) denotes the average of the luminance values of all the pixels contained in the slice S. It is possible, for example, to obtain this order relation as follows:

$$d = Avg(S(k2)) - Avg(S(k1)) + \alpha bi \quad (eq.2)$$

$$Avg(S'(k1)) = Avg(S(k1)) + d$$

$$Avg(S'(k2)) = Avg(S(k2))$$

First, d is computed using the equation (eq.2). S'(k1) is then obtained by modifying the parameter dct_dc_differential(k,j) of the first modifiable block B(k,j) (defined according to the size criterion of the DC encoding explained above) as follows:

$$dct\_dc\_differential'(k,j) = dct\_dc\_differential(k,j) + d$$

The slice S'(k2) remains unchanged. The parameter dct_dc_size is then recoded if necessary. The order relation of the equation (eq. 1) may also be obtained by modifying both S(k1) and S(k2), or only S(k2).

To reduce the visibility of the watermark, it is possible to choose pairs of slices of identical (or very similar) average. With the above method, all or a very large part of the slice is modified.

According to a variant of the second embodiment, the scope of the change can be reduced. Indeed, modifying the coefficient DC of the block $B(x_0,y)$ will have an impact on the average value of the blocks $B(x>=x_0,y)$ i.e. all subsequent blocks in the slice. This solution has the advantage to propagate a modification, i.e. a watermark, over a slice by only modifying selectively the stream and therefrom maintain the stream size. The higher the value of x, the more restricted the scope of the modification and therefore the visibility of the inserted watermark (but the more the robustness also risks being diminished). Therefore, after having added d to the DC coefficient of the block $B(x_0,y)$ (d possibly being a positive or negative), d can be subtracted from the DC of a block $B(x_1,y)$, $x_1 > x_0$. This operation makes it possible to find DC values that are identical to the original for any $x >= x_1$. This method makes it possible to modify the DC coefficients of a slice several times, for example to bury different watermark bits. This solution makes it possible to reduce the visibility of the watermark.

According to an advantageous embodiment of the invention, the visibility of the watermark is controlled. Indeed, modifying the values of the parameters dct_dc_differential for a block can have a major impact on quality. In practice, this modification is propagated to all the subsequent blocks in the slice. Also, dct_dc_differential can take only integer values. The minimum modification amplitude possible for the DC is therefore intra_dc_mult, which depends on intra_dc_precision. This quantification can provoke a visible discontinuity, either in time or in space. Over a relatively uniform area of the image, the boundary between a watermarked slice and the slices just above or just below (if they have not been watermarked) can be perceptible. Similarly, if the luminance varies very little from one image to another, the modification caused by the watermark can make an annoying flickering appear.

Different criteria can be used to control the visibility of the watermark:
- an amplitude criterion,
- a temporal criterion,
- a spatial criterion.

Amplitude Criterion

The visibility can be controlled by marking only the images where intra_dc_precision is greater than a given threshold.

It is also possible to reduce the modification amplitude by increasing the value of intra_dc_precision by $\delta$. It will then be necessary, to retain the same dynamic, to multiply the coded values of DC by $2^\delta$. To do this, it is enough to increase the values of dct_dc_size by $\delta$, and to multiply by 2 (add a 0) the values of dct_dc_differential.

Temporal Criterion

A strong temporal activity in the sequence, that is, a major movement or change, helps to mask the watermark and make it less visible. However, a temporal change located in a static sequence is very visible. Indeed, it produces a flickering effect. Also, the motion compensation used in the encoding can help to make the watermark less visible. If the sequence is very static, the motion compensation is effective and a major proportion of the visual information of the I images and blocks is propagated to the subsequent P and B images. The watermark inserted on the I blocks is then itself propagated to the P and B images, which increases its robustness and reduces its visibility (less flickering).

To measure the visibility temporal criterion, the average M(t) of the pixel luminance values over the areas z of the image can be considered. These areas are preferably the slices, they can also be groups of slices, blocks, macroblocks, pixels or the entire image. A first criterion consists in performing the watermarking, decompressing the MPEG stream obtained, then measuring the visibility (the decompression can be partial, i.e. only the images of the group of images concerned are considered). For this, the temporal activity difference about a watermarked Intra image (or a block) is measured:

$$C_1 = \frac{(M'(t_I) - M'(t_I - 1))^2 + (M'(t_I) - M'(t_I + 1))^2}{\sum_{t \in T1} (M'(t) - M'(t-1))^2}$$

where:

M'(t) is the average of the pixel luminance values of the area in the image of temporal index t after said image has been watermarked and reconstructed from the MPEG stream;

M'($t_I$) is the average of the pixel luminance values of the area in the original image of temporal index t; and T1 is a set of images around the Intra image.

For example, T1=[$t_I$−τ;$t_I$−1]∪[$t_I$+1;$t_I$+τ], where a is a parameter linked to the number of images to take into account for computing the motion, this number of images equals 2*τ. For computing C1, it is also possible to consider only the images preceding the Intra, or only the images following the Intra.

If C1 is great, the visibility of the watermark is great: to control the imperceptibility of the watermark, areas are therefore chosen such that $C_1 < s_1$, $s_1$ being a threshold. In the areas where $C_1 > s_1$, the watermark is replaced with the original data.

Note that $C_1$ is not defined if the denominator is zero; an equivalent criterion is, however, obtained by comparing the numerator to $s_1$ times the denominator. This note applies for all the criteria defined hereinafter. The drawback of the above criterion is that it does not take into account the characteristics of the original Intra image; in particular, if a change of plane occurs in the Intra image (which often occurs with powerful encoders), $C_1$ is very great and therefore does not satisfy the visibility criterion, whereas the watermark is completely masked. To overcome this drawback, we propose to take into account the temporal differences about the Intra already present in the original stream:

$$C_2 = \frac{(M'(t_I) - M'(t_I - 1))^2 + (M'(t_I) - M'(t_I + 1))^2}{\sum_{t \in T2} (M(t) - M(t-1))^2}$$

With T2 being the set of images around the Intra image, including the Intra image, for example T2=[$t_I$−τ;$t_I$+τ]

Another criterion consists in assessing the significance of the motion in an area based on the motion vectors of the stream, for example:

$$C_3 = \frac{1}{\sum_{t \neq t_I} \sum_b \sum_i V^i(t,b)^2}$$

$V^i(t,b)$ being the $i^{th}$ motion vector of the block N° b of the image t (non Intra) (i is equal to 1 in the P images, it is equal to 1 or 2 in the B images).

This criterion offers the benefit that it is necessary to decompress only a small part of the stream to calculate visibility, i.e. those part that represents the motion vectors. Calculating $C_3$ is therefore much faster.

For each criterion, a different threshold can be used based on the actual observed visibility.

Spatial Criterion

To estimate the visual impact of a spatial discontinuity generated by the watermarking, it is possible to use any estimator of the signal-to-noise ratio that is well known from the literature, for example:

$$C_4 = \frac{\sum_{x,y}(M'(x,y) - M(x,y))^2}{\sum_{x,y} M(x,y)^2}$$

This operation can be performed in the space domain or in the frequency domain (DCT). It is possible, for example, in the frequency domain, to calculate C4 only on the DC coefficients.

It will be noted that the watermark modifies a closely related area of the image (slice or group of slices). Visually, there is therefore a risk of seeing a transition "line" appear between marked and unmarked area. Another criterion consists in comparing the amplitude of the vertical component of the gradient of the image in the transition area between marked/unmarked area, or between two differently marked areas.

Remember that the gradient is defined as:

$$\vec{\nabla} I(x,y) = \left(\frac{\partial I(x,y)}{\partial x}, \frac{\partial I(x,y)}{\partial y}\right)$$

The vertical component $$\nabla_y I(x,y) = \frac{\partial I(x,y)}{\partial y}$$

can be approached, in the discrete domain, by any filter that is high pass in the vertical direction, for example:

$$\frac{I(x, y+2) + I(x, y+1) - I(x,y) - I(x, y-1)}{4}$$

It is possible to consider a filter of shorter or longer length, depending on whether you want to locate a transition or, on the contrary, take account of longer range modifications. The vertical high-pass filter can be combined with a horizontal low-pass filter to appreciate the general trend of the variations. Similarly, it is possible to calculate a long range gradient in the DCT domain by considering the variations of the DC coefficient along the vertical axis.

An absolute criterion can be used:

$$C_5 = \sum_x (\nabla_y I'(x,y))^2$$

Or a relative one:

$$C_6 = \frac{\sum_x (\nabla_y I'(x,y))^2}{\sum_x (\nabla_y I(x,y))^2}$$

y is the y axis of the transition between marked/unmarked area, x takes the set of x-axis values that are possible over the transition area.

Note that if the marking modifies only certain parts of the slice (as described above), it is also possible to use a similar criterion on the horizontal transitions between marked/unmarked area or between two differently marked areas. It is then necessary to take a horizontal gradient rather than a vertical one, and replace the summations on x by summations on y.

Taking into Account Colour Quantizations

When a video is played by a computerized device, the graphics cards and video playback software can affect the colours displayed on the screen. In particular, the colours can be quantized. The table of the colours used for the display has only a limited number of elements, far less than the size of the overall space that is equal to $2^{cn}$ (c being the number of components and n being the number of bits per component). To do this, the drivers and/or graphic software perform a vector quantization of the calorimetric space, i.e. a certain number of "near" colours are replaced in the display by a single colour. The quantization can be performed more or less intelligently and the space can be partitioned into areas of identical or variable size (algorithms of the state of the art: uniform quantization, popularity, median cut, octree and other algorithms).

The colour quantization can be associated with a raising of the variable contrast.

These processes can affect the visibility of the watermark: if the colours are strongly quantized, over uniform areas of the image, it may be that the watermark switches the colour from one quantization level to another. In this case, the visibility of the watermark is increased.

In order for the quantization of the colours not to make the watermark too visible, the effects obtained by quantization can be simulated (by applying one or more algorithms of the state of the art), and the real impact of the watermark obtained can be measured using one or more of the preceding criteria.

To make the prediction of the colour quantization effect more rapid and more independent of the algorithm actually used, it is also possible, in addition to the spatial criterion, the amplitude criterion and the temporal criterion, to consider a number-of-colours criterion:

$$C_7 = \frac{1}{|\Phi|},$$

$|\Phi|$ being the number of different colours in the image.

It is also possible to consider not the number of colours but their frequency distribution (histogram of the image). The quantization of the colours and the adaptation of the contrast will have less visual impact on an image with a histogram that is well equalized (almost flat):

$$C_8 = \frac{1}{\sum_\varphi f(\phi)} \text{ or } C_9 = \frac{1}{\sum_\varphi (f(\phi))^2}$$

The criteria can be combined with each other to obtain a finer control of the visibility. For example, they can be combined together using a weighted sum of all the criteria. In this case an area is said to be modifiable if the weighted sum for this area is below a predefined threshold. According to a variant, they can be combined by a logical operator AND, i.e. an area being modifiable only if each of the criteria are below a predefined threshold.

The method described above may be advantageously used for the protection of new generation DVD (Blue Ray). To this aim, a preprocessing step is applied before the watermarking step itself. The preprocessing step comprises the following sub-steps:

watermarking the stream by selecting appropriate slices using watermarking keys (the key ensures the security of the method) and in each of these slices the first modifiable block using the criterion of size;

applying the visibility criterion (or criteria) using the original sequence and the corresponding watermarked stream to select the slice or the slices or the parts of slices that may be marked;

possibly adapting the value of the parameter d depending on these visibility criterion (or criteria);

creating a marking map, i.e. a map identifying for each DC coefficient to be watermarked, the position of the original binary word, i.e. the original sequence of bits, encoding said DC coefficient, by an offset value with respect to the beginning of the stream and associating to each offset value the binary word to be inserted in replacement of the original binary word, the binary word to be inserted being computed according to one of the algorithm described previously, i.e. the additive modulation algorithm or the substitutive modulation algorithm.

possibly calculating/inserting synchronization patterns.

The preprocessing can generate a modified stream (insertion of the synchronization watermark, modification of the coding parameters) or even maintain the original stream. The marking map is advantageously inserted in the DVD with the original coded stream by the DVD manufacturer. The watermarking step itself is advantageously achieved in the DVD player by a watermarking module. When the DVD is inserted in the DVD player, the watermarking module read the marking map from it and is able to watermark directly the original stream by replacing the original words with the modified binary words read from the marking map at the appropriate location that is itself determined by the marking map using the corresponding offset values.

The watermarking step itself is simplified thanks to the preprocessing Depending on the message to be watermarked, it will be enough to select the replacement values from the marking table for each of the areas, and to perform the substitution in the stream.

We have seen an exemplary application of the invention with fingerprinting for VoD. Another application is the fingerprinting of DVDs or screeners: a unique number is watermarked for each individual copy, making it possible to identify the recipient of the DVD. In the case of piracy, reading the number makes it possible to identify the guilty user. Another application is video watermarking by new generation DVD players (Blue Ray type: BDP). The watermarking is done when the video is played, on the stream that is to be decoded. The watermarked message can be unique for each appliance, or even for each model or each series of appliances. The video signal output from the DVD player will therefore be watermarked differently according to this identifier. In case of massive fraud, this makes it possible to identify the suspect models and, by adjusting complementary encryption and DRM mechanisms, to revoke the models involved.

The invention claimed is:

1. Method of watermarking a binary stream resulting from the encoding of a set of coefficients representative of a sequence of images comprising at least one DC coefficient of an Intra block encoded by predictive coding, called predictively coded DC coefficient, the method comprises:
- a) identifying, in said binary stream, a first binary word representing said predictively coded DC coefficient;
- b) computing a modified DC coefficient from said predictively coded DC coefficient on the basis of at least one watermarking bit;
- c) encoding said modified DC coefficient into a second binary word; and
- d) replacing in said binary stream said first binary word with said second binary word;

wherein said steps a) to d) are applied only on images having a value of quantizing precision being greater than a first predefined threshold.

2. Method according to claim 1, wherein said modified DC coefficient is computed as the sum of said predictively coded DC coefficient and a marking value derived from said at least one watermarking bit.

3. The method according to claim 1, wherein the binary stream is an MPEG2 binary stream and wherein the value of quantizing precision is intra_dc_precision.

4. The method according to claim 1, wherein said steps a) to d) are only applied on parts of the images for which a temporal visibility criteria is lower than a second threshold.

5. The method according to claim 4, wherein said temporal visibility criteria is the following:

$$C_3 = \frac{1}{\sum_{t \neq t_I} \sum_b \sum_i V^i(t,b)^2}$$

where:
- t is the index of an image in the temporal neighbourhood of said INTRA image;
- $t_I$ is the index of said INTRA image; and
- $V^i(t,b)$ is the $i^{th}$ motion vector of a block b in an image of index t.

6. The method according to claim 1, wherein said steps a) to d) are only applied on images for which a spatial visibility criteria is lower than a third threshold.

7. The method according to claim 1, wherein said steps a) to d) are only applied on images for which inverse number of colors is lower than a fourth threshold.

* * * * *